(12) United States Patent
Yu et al.

(10) Patent No.: US 10,481,937 B2
(45) Date of Patent: Nov. 19, 2019

(54) SHADOW COMMAND RING FOR GRAPHICS PROCESSOR VIRTUALIZATION

(71) Applicant: INTEL CORPORATION, Santa Clara, CA (US)

(72) Inventors: Zhi Hong Yu, Beijing (CN); Richard Dunphy, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 15/545,274

(22) PCT Filed: Mar. 23, 2015

(86) PCT No.: PCT/CN2015/074826
§ 371 (c)(1),
(2) Date: Jul. 20, 2017

(87) PCT Pub. No.: WO2016/149892
PCT Pub. Date: Sep. 29, 2016

(65) Prior Publication Data
US 2018/0011729 A1    Jan. 11, 2018

(51) Int. Cl.
*G06F 9/48* (2006.01)
*G06F 9/455* (2018.01)

(52) U.S. Cl.
CPC ........ *G06F 9/45558* (2013.01); *G06F 9/4843* (2013.01); *G06F 9/4881* (2013.01);
(Continued)

(58) Field of Classification Search
None
See application file for complete search history.

(56) References Cited

U.S. PATENT DOCUMENTS

| 7,053,863 B2 * | 5/2006 | Glen | G06F 3/1438 |
| | | | 345/1.1 |
| 2003/0027517 A1 * | 2/2003 | Callway | G06F 3/14 |
| | | | 455/3.01 |

(Continued)

FOREIGN PATENT DOCUMENTS

| CN | 103729235 A | 4/2014 |
| CN | 103761139 A | 2/2017 |

OTHER PUBLICATIONS

State Intellectual Property Office of the P.R. China, International Search Report and Written Opinion or International Patent Application No. PCT/CN2015/074826, dated Dec. 10, 2015, 12 pages.

(Continued)

*Primary Examiner* — Isaac T Tecklu
(74) *Attorney, Agent, or Firm* — Finch & Maloney PLLC (57) ABSTRACT

A shadow command ring is described for graphics processor virtualization. In one example a command batch is loaded from a virtual machine of a general purpose processor into a physical command ring of a graphics processor. A physical tail pointer register of the graphics processor is set and the command batch and the physical tail pointer are trapped at a mediator. The mediator copies the trapped command batch and the physical tail pointer in a shadow command ring and sets a virtual tail pointer. The execution of the physical command ring is monitored and if an error is determined then the physical command ring is cleared and reloaded using the shadow command ring.

27 Claims, 5 Drawing Sheets

(52) U.S. Cl.
CPC .............. *G06F 2009/45575* (2013.01); *G06F 2009/45591* (2013.01)

(56) References Cited

U.S. PATENT DOCUMENTS

| | | | | |
|---|---|---|---|---|
| 2011/0084973 | A1* | 4/2011 | Masood | G06T 1/20 345/506 |
| 2012/0001905 | A1* | 1/2012 | Andonieh | G06T 1/20 345/419 |
| 2016/0292816 | A1* | 10/2016 | Dong | G06F 12/10 |
| 2016/0328333 | A1* | 11/2016 | Dong | G06F 12/02 |
| 2017/0123849 | A1* | 5/2017 | Tian | G06F 9/455 |
| 2017/0236246 | A1* | 8/2017 | Mrozek | G06F 9/5027 345/522 |
| 2017/0329623 | A1* | 11/2017 | Dong | G06F 9/45558 |
| 2018/0033116 | A1* | 2/2018 | Tian | G06F 8/36 |

OTHER PUBLICATIONS

International Preliminary Report on Patentability received for PCT Patent Application No. PCT/CN2015/074826, dated Oct. 5, 2017, 6 pages.

\* cited by examiner

SHADOW COMMAND RING FOR GRAPHICS PROCESSOR VIRTUALIZATION

CROSS-REFERENCE TO RELATED APPLICATION

This patent application is a U.S. National Phase Application under 35 U.S.C. § 371 of International Application No. PCT/CN2015/074826, filed Mar. 23, 2015, entitled SHADOW COMMAND RING FOR GRAPHICS PROCESSOR VIRTUALIZATION.

FIELD

The present description relates to the field of graphics processing commands and in particular to a command ring for graphics processing virtualization.

BACKGROUND

Many computing systems use a CPU (Central Processing Unit) for general tasks and a GPU (Graphics Processing Unit) for graphics tasks. The CPU is designed to be very flexible to perform a large variety of different computing tasks, while the GPU is designed to be very fast in performing graphics tasks. Graphics tasks tend to be very similar and tend to be very repetitive. As a result, the hardware of the graphics processor may be built with different sections that are each optimized for performing a specific task. These sections may include a render engine, a display engine, a video codec engine, a video quality engine, etc. The GPU may be present in the system on a separate printed circuit board from the system board, on a separate chip on the same system board, as a separate semiconductor die in a package that includes a central processor die, or as a separate core in a multi-core processor.

As GPUs become more common and more powerful, more tasks are being assigned to the GPU to allow the computing power of the GPU to be more fully used. The assignment of tasks is normally controlled by the operating system through the CPU. One group of these tasks includes video encoding, decoding, and transcoding. Without a GPU, video encoding, decoding and transcoding are sometimes very high stress workloads for general purpose processors. As a result, these are commonly performed as GPU-accelerated workloads with the CPU performing some of the work and the GPU accelerating the task by also performing some of the work.

With the wide deployment of cloud infrastructures and the growth of software defined networks (SDN), GPU-accelerated workloads are being moved into VMs (Virtual Machines) as well. However, virtualization technologies may have a big impact on the performance of GPU-accelerated video transcoding and other workloads. As a result, the speed of video transcoding workloads drops significantly on a virtualized environment compared to a native environment.

The GPU, as a device, usually has several command rings in its main memory. The command rings serve as the interface between the GPU and a software graphics driver running on a CPU. In some cases, a mediated pass-through mechanism is used. The mediated pass-through allows partial access to partial device resources, for example memory access, to each VM without hypervisor intervention. In such a case, only privileged operations, such as MMIO (Memory-Mapped Input/Output), GTT (Graphics Translation Tables), etc., are mediated through a software layer. This approach reduces the virtualization overhead load. However, during VM switching, the command rings for the GPU are emptied before a new VM can load its commands into the ring for execution.

In, for example, a GPU-accelerated video transcoding workload, the workload is sent from the CPU to the GPU. Heavy workloads require very little CPU utilization to fully occupy the GPU. System speed is decreased when the GPU command rings are emptied and the GPU must wait before working on the next task. An empty-and-load scheduling mechanism stops any GPU-accelerated task while the ring is being emptied and refilled.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

As described herein, two memory-mapped input/output (MMIO) registers, may be used for each command ring, a register for a head and a register for a tail, to indicate whether the command ring is empty or not. If the ring is not empty, the GPU fetches commands in the ring and executes the commands. This structure may be used to eliminate any idle period for the GPU during any ring clean-up and restore process. The principles described herein may be applied to many different hardware video codec engines Video performance, in particular, is increased in a virtualized environment, however, the embodiments are not so limited.

In order to keep the command ring from becoming empty or being emptied. i.e. non-empty, a shadow ring mechanism may be built in a root domain, such as Dom0, which keeps track of ring commands for each VM. The ring commands may then be queued immediately for GPU execution. The shadow ring mechanism may also keep a job linked list to save shadow head and tail pointers for each VM and the mapping of the shadow head and tail with the real MMIO head and tail registers for the physical GPU.

Whenever a graphics driver updates the tail register, an item may be added into the job linked list. The graphics driver in the corresponding VM interacts with the shadow head and tail registers in the job linked list. The shadow ring mechanism may manage the shadow registers and their mapping with the physical registers. During a switch from one VM to another, a scheduler may immediately update the physical tail register. This allows it to submit the commands without waiting for the real command ring to empty. At the same time, the scheduler updates the shadow tail pointers for this VM accordingly. In this way, if the workload in each VM has many commands for the GPU, for example a video transcoding workload, the ring may be continuously fed with useful commands.

The GPU updates the head register of a command ring as it finishes executing commands in the command ring. As a result, the scheduler fetches the physical head register value regularly to track the progress of the GPU workloads and to update the job linked list accordingly. Fetching the head may be scheduled using a timer. The timer is started when a VM switch occurs. If the timer expires (or reaches its count) the head pointer is polled. The fetched head pointer value may be used to determine whether to reset the GPU in the VM. If the head pointer is read before the timer expires, because the physical command ring has filled and the graphics driver had to read the head register anyway, then the timer can be reset if the head pointer has moved. If there are any problems with the execution of commands in the physical command ring, then the scheduler can determine which VM submitted the affected commands. This may be done using the current head register value and relating it to the job list. The scheduler can reset the GPU, do a clean-up and then re-load all the commands from the appropriate shadow rings in Dom0 from the next VM.

Figure 1:
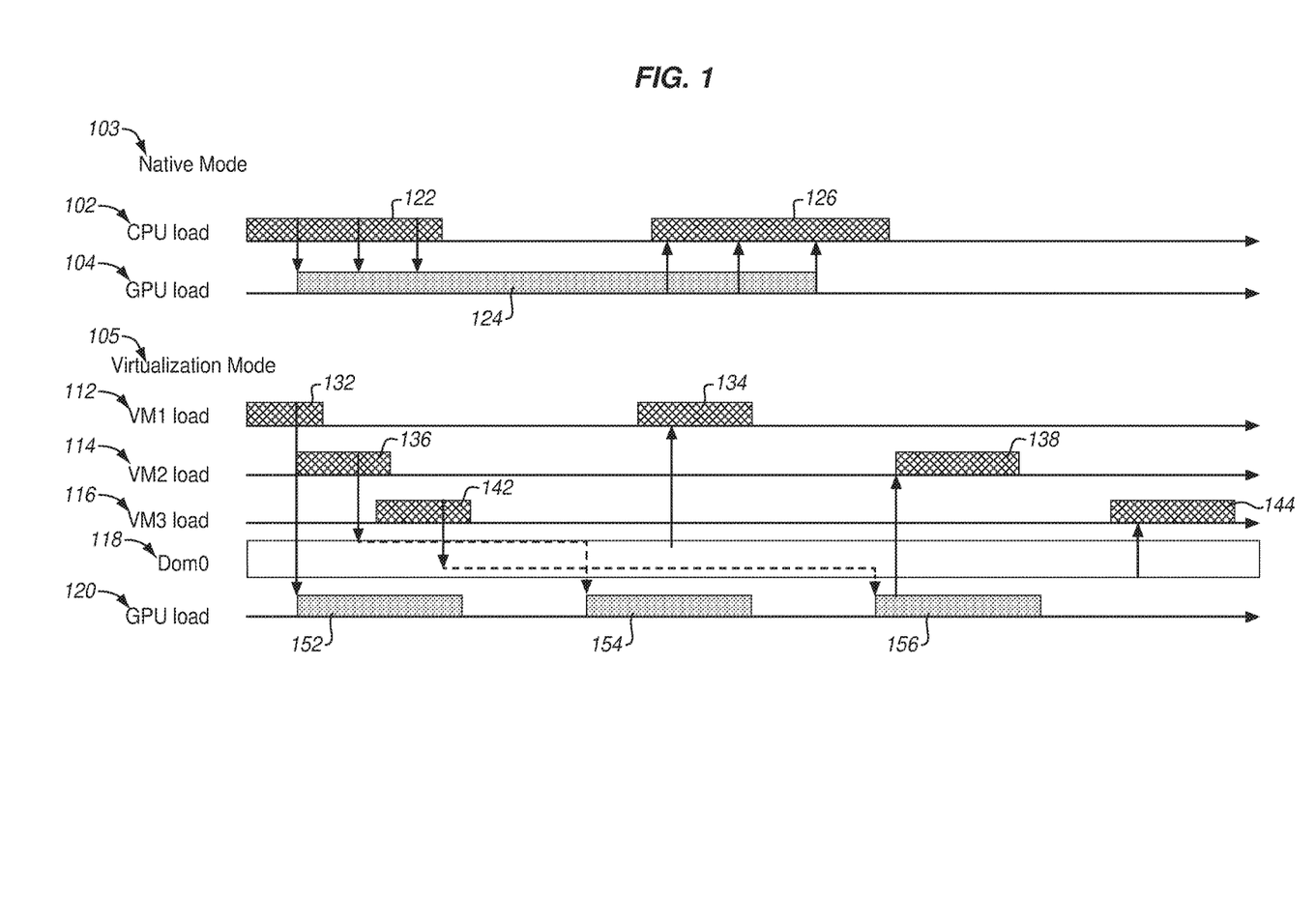
FIG. 1 is a diagram of workload transfers between a CPU and a GPU in native and virtualization modes according to an embodiment.

FIG. 1 is a diagram of workload distribution between a CPU and a GPU in different scenarios. In the diagram of FIG. 1, time moves from left to right and each line represents activity of a different entity. The system operates in two different modes. The first mode is a native mode 103. In this mode a CPU 102 processes a graphics workload 122, such as video transcoding for a time indicated as the length of the blue line that represents the workload. At some stage in the processing of this particular workload, tasks are transferred through a graphics driver to a GPU 104. The GPU processes the graphics workload 124 received from the CPU. As the workload is completed, it is transferred back to the CPU and the CPU starts another workload 126.

As shown, the CPU and GPU workloads overlap. This corresponds to the CPU handing intermediate results over to the GPU and it corresponds to the CPU handling tasks in series so that some tasks are handed over to the GPU while other tasks are still being processed or are yet to be processed. In the same way, the CPU workload 126 resumes while the GPU is still processing some of the workload. In order to accomplish the transcoding as quickly as possible the overlap between the CPU and the GPU should be as great as possible. Stated another way, the idle time at both processors should be minimized. It may be noted that during the gap between the two CPU workloads 124, 126, the CPU may perform other tasks not related to this particular graphics workload. The GPU may also be busy with other tasks not related to this particular graphics workload.

The system has a second operational mode 105 referred to herein as a virtualization mode. In this mode multiple virtual machines (VM) 112, 114, 116 process different graphics workloads using shared processing resources. Each VM has its own graphics driver with which the VM is able to assign graphics workloads to the GPU. The first VM, VM1 has a workload 132 which is running on a core or a thread of the CPU and it then reaches a state in which it can send a workload 152 to the GPU 120. The workload goes through an intermediary such as a hypervisor or other mediator, in this case shown as a domain, such as Domain 0 (Dom0) 118. The particular type of intermediary may be adapted to be consistent with the architecture for the virtualization. This particular virtualization system is provided as an example. There may be more domains, more VMs and variations in the particular configuration shown here.

The GPU executes the workload 152 and passes the results back to VM1 through the domain 118. As shown in this example, the domain is temporarily busy with other services 136, 142 involving the other VMs and so there is a delay between when the GPU workload 152 is completed and when VM1 is able to resume 134.

At about the same time that VM1 is generating a graphics workload. VM2 114 and VM3 116 are also executing respective workloads 136, 152 and generating graphics workloads 154, 156. These graphics workloads are passed to the domain to be handed over to the GPU for execution. The domain assembles a command ring for each graphics workload and then passes the workload to the GPU. In the illustrated example, the GPU executes each graphics workload 152, 154, 156 in series. The domain buffers the commands so that the commands are ready for execution after the preceding command is executed. After each graphics workload is completed the results are passed back to the respective VM 112, 114, 116 which then resumes the task with the rest of its respective workload 134, 138 144.

As shown, there may be delays caused by the distribution of work from multiple VMs to a single GPU as the GPU switches from one context to the next. The VMs generate workloads in the form of a command sequence. These commands are buffered in the domain and passed to the GPU as soon as possible without causing conflicts. There may also be delays caused by the limits of the domain in handling multiple simultaneous tasks. As described below the delay between each context is reduced using shadow command ring buffers. As shown, the utilization of the CPU and the GPU for a heavy graphics processing operation such as a video transcoding workload may experience some idle states. In a virtualization mode, there may be many more idle states on the GPU due to switching between different VM contexts. As shown, each VM context switch, from e.g. workload 132 to 136 to 142 may introduce a delay.

Figure 2:
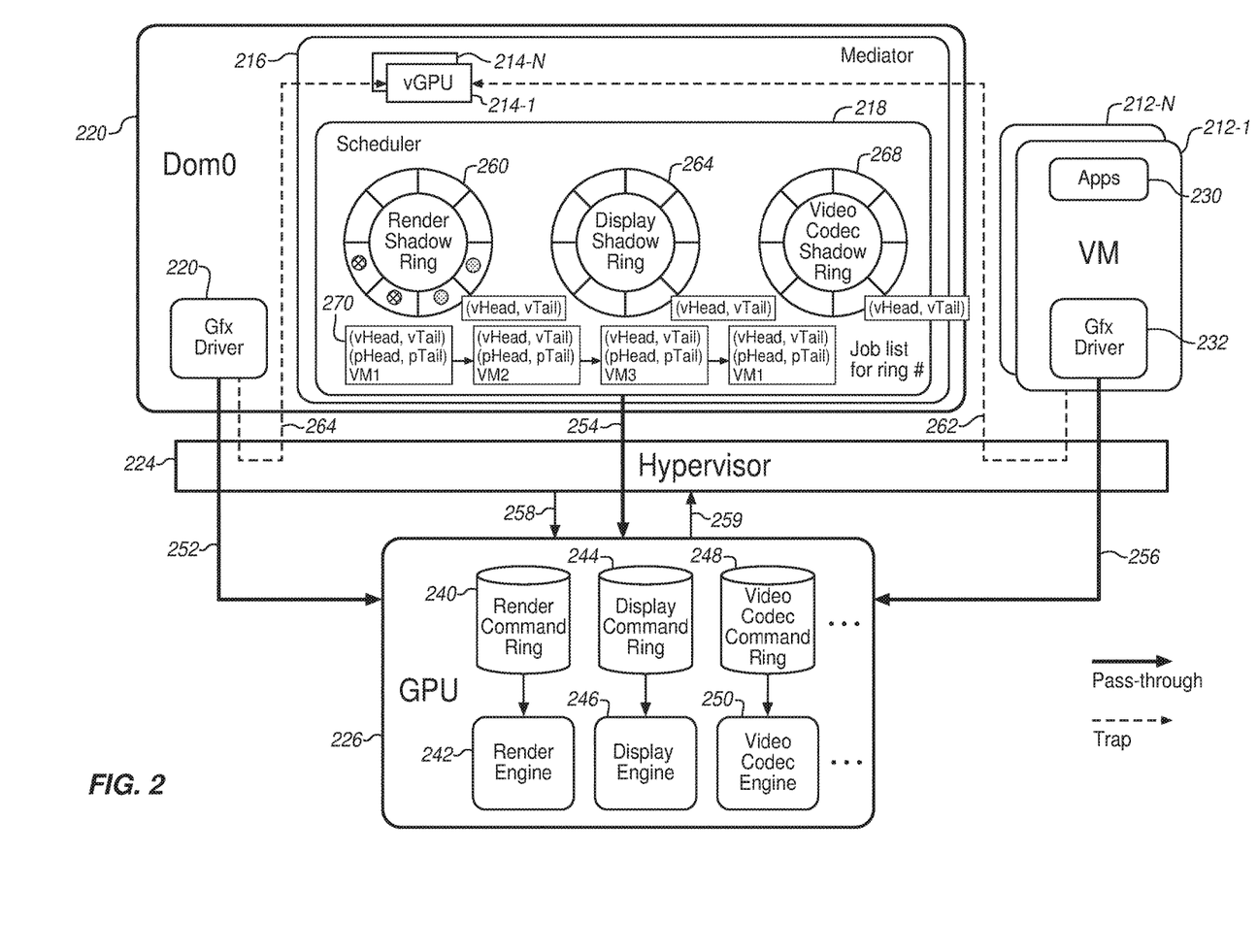
FIG. 2 is a block diagram of workload processing in a virtualized environment using shadow command rings according to an embodiment.

The delay may be reduced by using an effective scheduler that allows for transitions between contexts without a delay. FIG. 2 is a block diagram of workload processing in a virtualized environment such as that shown in FIG. 1. The system includes multiple VMs 212-1, 212-2, . . . 212-*n*. While only two are shown, there may be many more. Each VM has applications 230, such as a user space application, and a graphics driver 232 that receives graphics workloads for execution by a graphics processor 226. The graphics processor may be on the same semiconductor die, in the same package on a different die, in the same chassis in a different package on the same circuit board or on an adapter card, such as a PCI (Peripheral Component Interconnect) card, or on a different chassis.

The VMs 212 are coupled through a hypervisor 224 to a root domain 220 shown here as domain zero. The root domain includes a virtual graphics driver 222 that is coupled to virtual GPUs (vGPUs) 214-1, 214-2, . . . 214-*n*, one for each VM within a mediator 216. The vGPUs are coupled to a command scheduler 218 within the mediator of the root domain which is coupled to the physical GPU 226. The physical GPU is loaded from the virtual graphics driver 222 to the vGPUs and then the command scheduler 218 through the hypervisor 224 to the GPU 226 to execute any of a variety of different graphics workloads. These workloads are run by filling one of three command rings 240, 244, 248 each for a respective one of three graphics engine 242, 246, 250. There may be more graphics engines each with its own command ring. The processed workloads from the graphics engines are returned to the respective VM 212 through the vGPUs 214 to the virtual graphics driver 222 to the respective VM graphics driver 232.

The user space applications 230 of each VM 212 create command batches for a buffer for a particular piece of work and submit the buffered command batch to the graphics driver. The driver submits a pointer of the command batch buffer into an appropriate ring buffer of the GPU through a pass through line 256. The graphics driver will set a head pointer and a tail pointer for the command batch buffer. A dispatcher in the GPU (not shown) monitors the head and tail pointers and pulls the commands from the command ring. After each command execution the head pointer is updated to point to the next location in the command ring. When the head pointer is equal to the tail pointer, the GPU has reached the end of the command ring.

A GPU may have multiple command rings, one for each engine within the GPU. As shown, the GPU has a command ring 240 for a render engine 242, a command ring 244 for a display engine 246, and command ring 248 for a video codec engine 250. There may be multiple instances of each engine and additional engines, such as a video quality engine, blitter engine, physics engine and other engines, depending on the particular implementation. The fetching of commands and head register updates may be done using specific assigned registers such as GPU MMIO and GTT registers. Access between the VMs and the GPU are trapped by a mediator 224 in e.g. Dom0. This is shown by the trap lines 262, 264 between the VMs and the mediator.

A shadow ring mechanism is incorporated into the command scheduler 218 within the mediator 220. For each command ring 240, 244, 248, the mediator 220 maintains a separate shadow ring structure 260, 264, 268 for each command ring, respectively. Each shadow ring has a copy of the commands that are submitted to each corresponding GPU engine. In other words each shadow command buffer ring in the command scheduler 218 of the mediator 216 is a shadow copy of the real command buffer ring 240, 242, 248 in the GPU. In addition, a link list 270 is generated for each VM 212 to save the head and tail pointers and their mapping to physical registers for each task from each VM. As mentioned above, access to MMIO and GTT may be trapped by the mediator and a separate shadow head and tail pointer register may be maintained and updated.

Using the shadow command ring registers, each GPU engine command ring can be restored in the event of a failure through a direct data pass-through line 254 from the command scheduler 218 to the GPU 226. The command ring can be restored from the shadow ring to recover from the failure. The recovery may start at the beginning of a workload or from before the beginning of a workload. As a result, instead of waiting for the engine command ring to be empty, the mediator immediately updates the physical tail register and builds a mapping between the virtual tail register at the command scheduler and the physical tail register. When the GPU finishes the work at one engine for one VM, its physical head register may be updated. The mediator will receive this physical head register by trapping or after a time out. As a result the mediator knows the tasks that have been completed and is able to associate these tasks with the VM that generated the tasks. The mediator may then remove the corresponding task, or command sequence, from the job list.

In the operation of the system, one of the virtual machines 212, e.g. VM1 or VM2, submits a command sequence into a physical command ring 240, 244, 248 by increasing the MMIO tail register. This may be done directly through a pass-through line 256. The mediator 216 traps this by a trap line 282 from the graphics driver 232 of the VM to a virtual GPU (vGPU) 214. The mediator provides a vGPU for each VM. The trapped command sequence is then supplied from the vGPU into a corresponding shadow command ring 260, 264, 268 where it is maintained.

The mediator also uses the trap line to maintain a job list 270 for each ring and each VM. The mediator increases a vTail (virtual Tail) pointer and pTail (physical tail) pointer register and adds one item into the job list with a pHead (physical head) pointer equal to the pTail pointer in the previous item and with the vHead (virtual head) pointer equal to the vTail pointer of the corresponding command ring. The commands are put into the ring at the time that the pTail pointer register is updated.

The mediator also traps reads from the graphics driver 222 to the GPU. This is indicated using a trap line 264. When the read of the pHead pointer register is trapped, the mediator compares the pHead pointer read to the stored job list vHead pointer register value to determine if the pHead has been changed and, if so, then the corresponding vHead pointer register may be updated. The pHead and vHead are not normally the same but are related through a map such as a GTT. The mediator may then go through the job list to find out which job item corresponds to the range of the (pHead, pTail) pair. All the ties before this job have been completed and have been removed from the real command buffer. The mediator may then also remove these completed items from the corresponding shadow ring and the job list.

Figure 3:
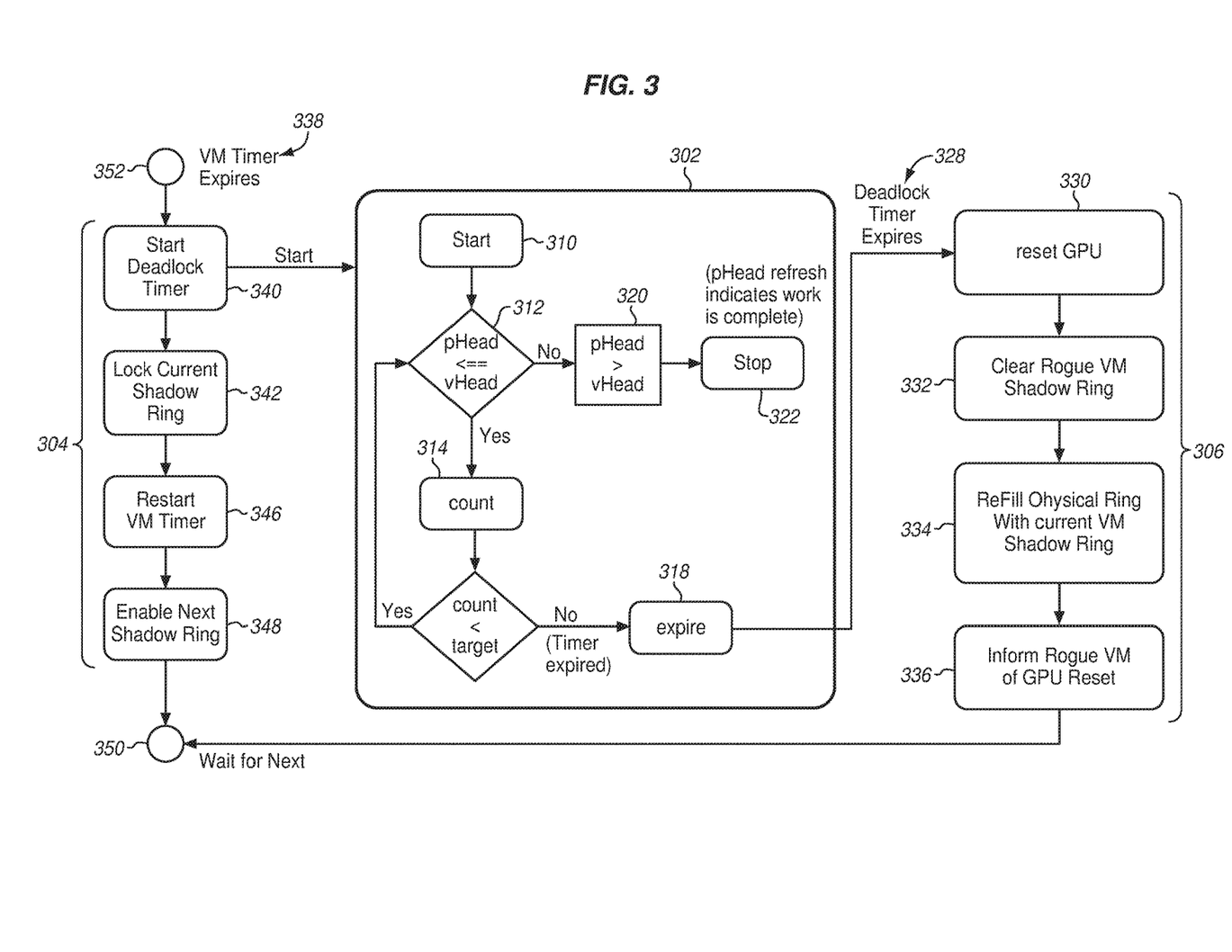
FIG. 3 is a process flow diagram of operating a timer for a shadow command ring according to an embodiment.

FIG. 3 is a process flow diagram for operating a timer. As an overview, there is a central control process 302 that connects to a timer process 304. Upon the occurrence of certain events as determined by the control process, a reset process 306 is triggered. The control process starts 310 when a context switch occurs and execution switches to a new context from another VM. These events are indicated by the expiration of a VM timer at 338. In such a circumstance a deadlock timer may be started at 340. The deadlock timer is used to determine whether a GPU task is deadlocked by testing whether the process has timed out.

The deadlock timer locks the shadow command ring that is currently being executed at 342. When the task is completed a VM timer is restarted at 346 and the next shadow command ring is enabled at 348. This timer cycle repeats from the bottom 350 back up to the top 352 as the system processes successive graphics workloads from the VMs.

Also upon the expiration of the VM timer at 338 the control process 302 is started at 310. When the timer expires, or reaches the set count, then the vHead pointer register is polled at 312 to determine whether the vGPU in the mediator must be reset at 330. The pHead pointer register is compared to the vHead pointer register at 312.

If the pHead pointer is not less than or equal to the vHead pointer at 312, then it is more than the vHead pointer at 320 and the process is stopped at 322. The VM graphics driver has read the register so that the pHead has been refreshed and the workload on this engine for this VM is completed. The process may be stopped at 322. It will restart at 310 when the next deadlock timer is started for the next workload from a VM.

On the other hand, if the pHead pointer is less than or equal to the vHead pointer then the count is polled at 314 and compared to the target count. If the count is still less than the target count at 316, then the counter returns to poll the pHead counter at 312.

If the pHead pointer register is read at 312 before the timer expires at 316, this means that the physical command ring buffer in the GPU has filled and the VM graphics driver has read the register. The timer may be reset if the pHead pointer has been changed. This suggests that the command buffer ring has moved and has not stalled. If the head pointer read is greater than what is required by the VM, then the corresponding command sequence has been completed and the timer is canceled at 318.

When the timer expires then a deadlock timer expired signal 328 is sent to reset the GPU at 310. The timer expired decision at 326 occurs when the pHead register does not advance at 312 before the timer times out at 316. When this occurs there may be an issue in the commands. Such an issue may require that the GPU command ring buffer be reset at 330 for a particular graphics engine. Using the job list and the vHead, vTail and mapping table, the mediator is able to determine the current job item being executed, The GPU may be reset, by clearing at 322 the portion of the shadow command ring corresponding to the timed out task. The mediator may then refill or load the physical command ring using the remaining commands from the corresponding shadow ring at 334 and inform the affected VM of the reset at 336. All of the unfinished job items may be reloaded and queued for execution in the physical command ring buffer using commands in the shadow ring buffer. The current job item may be re-loaded or rejected, due to the issue that caused the system to time out.

Figure 4:
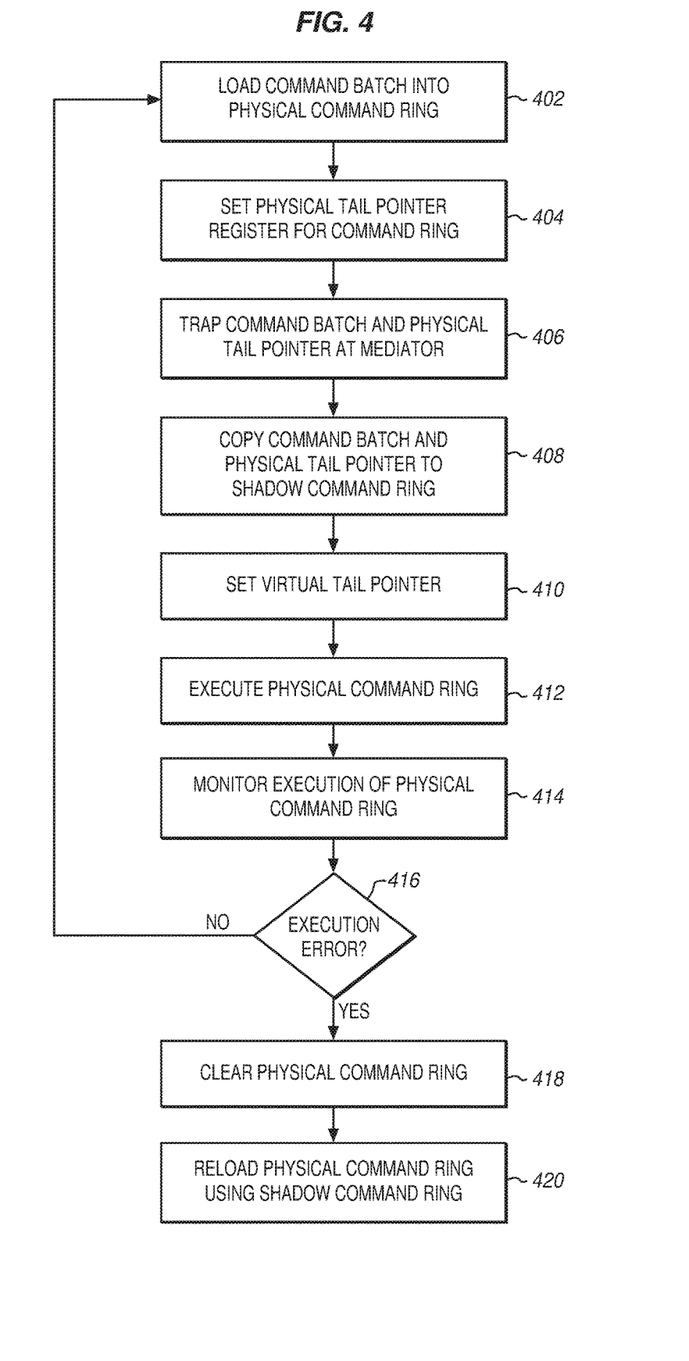
FIG. 4 is a process flow diagram of managing and restoring command batches using a shadow command ring according to an embodiment.

FIG. 4 is a process flow diagram of managing command batches and restoring from failures according to an embodiment. At 402 a command batch from a virtual machine of a general purpose processor is loaded into a physical command ring of a graphics processor. In a virtual machine environment, the command batch may be loaded by the virtual machine's graphics driver into a virtual graphics processor. The virtual graphics processor then uses a graphics driver to load the command batch into the physical graphics processor. The virtual graphics processor and associated driver allow all of the virtual machines to act independently using a single shared physical graphics processor. The command batch corresponds to a workload generated by an app 230 running on the virtual machine. While video encoding, decoding, and transcoding are discussed herein, there are a variety of different possible workloads that may be accelerated using the GPU. The decision to use the GPU and how to use the GPU may be a part of the software application 230, the driver 232 or the operating system.

At 404, the virtual machine sets a physical tail pointer register of the graphics processor for the command ring based on the size of the command batch. The command batch and the physical tail pointer are trapped at a mediator at 406. The mediator copies the trapped command batch and the physical tail pointer in a shadow command ring of the mediator at 408. Due to the trapping and copying, the shadow command ring contains all of the commands that are included in the physical command ring. This allows the physical command ring to be restored if there is an error.

At 410, the mediator sets a virtual tail pointer at the mediator based on the trapped physical tail pointer. The mediator may also set a head pointer and a job list. This allows each command batch to be separately identified. If there is an error in one job on the job list, then the physical command ring can be restored from the shadow command ring without the one identified job.

At 412 the graphics processor executes the physical command ring. This is a continuing process that is performed one command batch at a time. In the execution, a head pointer of the command batch buffer is inserted into the command ring. The graphics processor monitors the head and tail pointer and fetches a command from the command ring if the head pointer is not equal to the tail pointer. The fetched command is executed by the graphics processor. The head pointer is then updated by the graphics processor in response to executing the fetched command. This is repeated, fetching a command, executing the command, and updating the head pointer until the head pointer is equal to the tail pointer.

At 414, the mediator monitors the execution of each command batch in the physical command ring by the graphics processor. This may be done, for example, by comparing the physical head pointer to a virtual head pointer set by the mediator. Each time the graphics processor changes the physical head pointer, the mediator can change the virtual head pointer. As the physical head pointer continues to change, the mediator determines that execution is continuing. When the physical head pointer matches the tail pointer, then the mediator determines that execution has been successfully completed. When the context switches to a new command batch, then the physical head and tail pointers are changed and the mediator can update the corresponding virtual registers to allow the next context to be monitored.

At 416, the mediator determines whether an error has occurred in the execution of the command batch. If there is no error, then execution continues with the current command batch and the process returns to 402 so that more command batches may be loaded into the physical and shadow command rings.

An error may be determined in any of a variety of different ways. One way is to determine if the graphics processor is hanging or has stalled. This may be done using a deadlock timer. The deadlock timer for a particular command batch may be set when the graphics processor starts execution of the command batch. The start of execution may be determined in different ways. One way is to determine a context switch from the command batch of one virtual machine to the command batch corresponding to the one being timed. An error is determined if the command batch execution is not completed before the deadlock timer expires.

When the timer expires, the head and tail pointers may be used to determine whether the execution is completed. The pointers may also be used for general monitoring. In some implementations, when the graphics processor has reset or changed the physical head pointer value, then execution is continuing and the timer may be reset.

If there is an error, then at 418, the physical command ring is cleared and at 420, the physical command ring of the graphics processor is reloaded using the shadow command ring. When the shadow command ring contains multiple command batches from multiple virtual machines, the physical command ring may be reloaded without the command batch that caused the error.

When the shadow command ring contains multiple command batches from multiple virtual machines, the command batch that caused the error can be found using the physical head and tail pointers. The mediator monitors execution by comparing the physical head pointer to a virtual head pointer set by the mediator. The currently executing command batch may be found by using a command range between the physical head pointer and the physical tail pointer. When the physical command ring is reloaded it can be reloaded without the found command batch.

The physical command ring and the shadow command ring may be repeated for each of the multiple command rings, each command ring being for a different task of the graphics processor, such as a render engine, a display engine, and a video codec engine. The command rings for each engine may, however, share command batches from multiple virtual machines.

Figure 5:
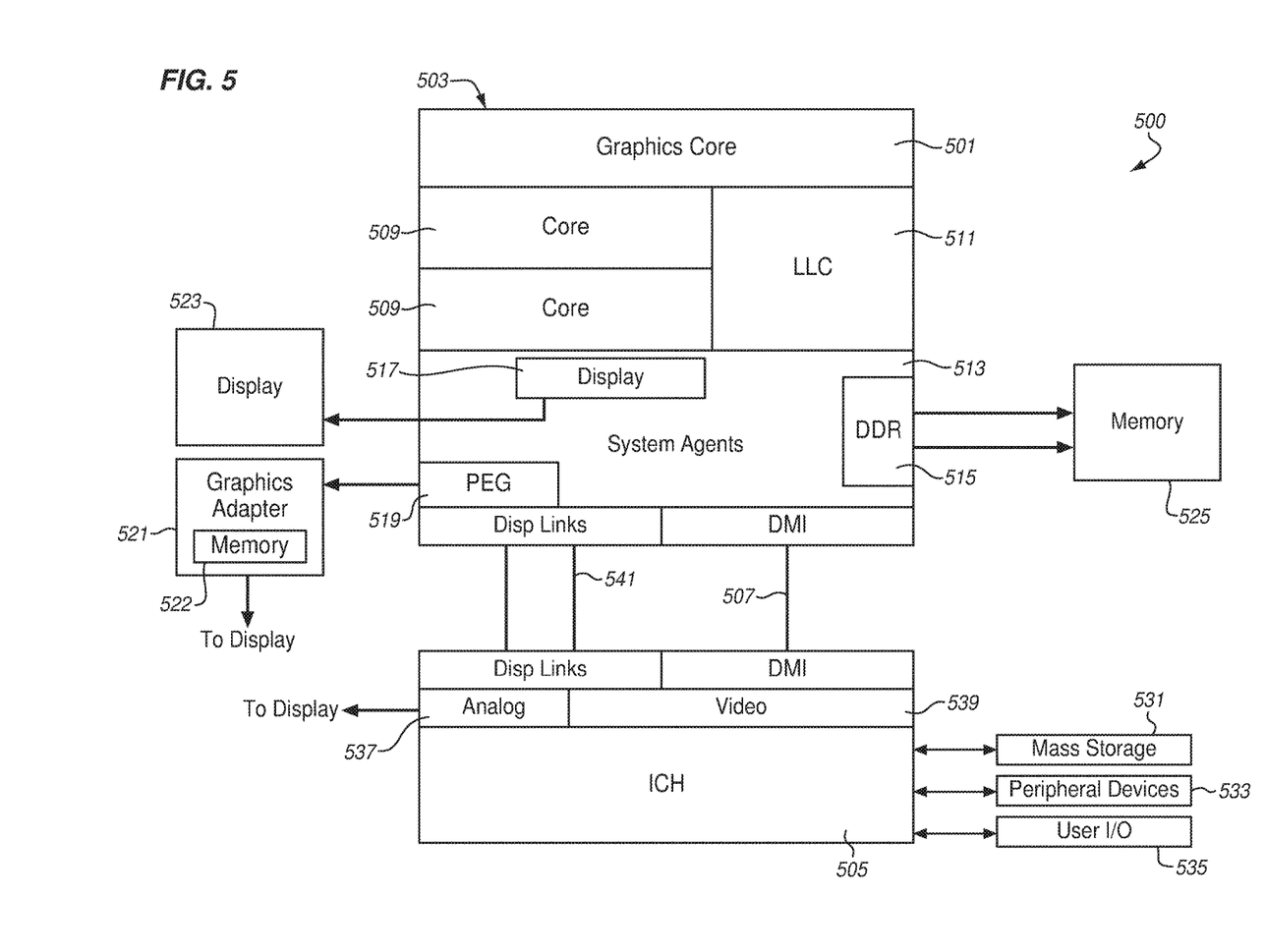
FIG. 5 is a block diagram of a computer system having one or more graphics processors and graphics memories according to an embodiment.

Referring to FIG. 5, the graphics core 503 is shown as part of a larger computer system 500. The computer system has a CPU 503 coupled to an input/output controller hub (ICH) 505 through a DMI (Direct Media Interface) 507. The CPU has one or more cores for general purpose computing 509 coupled to the graphics core 501 and which share a Last Level Cache 511. The CPU includes system agents 513 such as a memory interface 515, a display interface 517, and a PCIe interface 519. In the illustrated example, the PCIe interface is for PCI express graphics and can be coupled to a graphics adapter 521 which can be coupled to a display (not shown). The graphics adapter includes a graphics processing unit and its own memory 522 containing buffers, registers, and other components as described above. A second or alternative display 523 can be coupled to the display module of the system agent. This display will be driven by the graphics core 501. The memory interface 515 is coupled to system memory 525. This memory may be used by the graphics core 501 and contains one or more ring buffers, batch buffers and other registers as described above.

The input/output controller hub 505 includes connections to mass storage 531, external peripheral devices 533, and user input/output devices 535, such as a keyboard and mouse. The input/output controller hub may also include a display interface 537 and other additional interfaces. The display interface 537 is within a video processing subsystem 539. The subsystem may optionally be coupled through a display link 541 to the graphics core of the CPU.

A wide range of additional and alternative devices may be coupled to the computer system 500 shown in FIG. 5. Alternatively, the embodiments may be adapted to different architectures and systems than those shown. Additional components may be incorporated into the existing units shown and more or fewer hardware components may be used to provide the functions described. One or more of the described functions may be deleted from the complete system.

While the graphics core 501 is shown as integrated with the CPU that also includes general processing cores 509 and other components, the graphics core may be constructed as a separate component with communication interfaces to the LLC 511 and general purpose cores. Alternatively, the graphics core and its related components may be constructed on a separate die that is enclosed in the same or a different package. Other components, such as the memory 525. ICH 505 and system agents 513 may also be constructed on the same or different dies in the same or different packages.

A wide range of additional and alternative devices may be coupled to the computer system 500 shown in FIG. 5. Alternatively, the embodiments may be adapted to different architectures and systems than those shown. Additional components may be incorporated into the existing units shown and more or fewer hardware components may be used to provide the functions described. One or more of the described functions may be deleted from the complete system.

It is to be appreciated that a lesser or more equipped system than the examples described above may be preferred for certain implementations. Therefore, the configuration of the exemplary systems and circuits may vary from implementation to implementation depending upon numerous factors, such as price constraints, performance requirements, technological improvements, or other circumstances.

Embodiments may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be implemented in varying physical styles or form factors. In some embodiments, for example, a small form factor device may be implemented as a mobile computing device having wireless capabilities. A mobile computing device may refer to any device having a processing system and a mobile power source or supply, such as one or more batteries, for example.

Examples of a computing device may include a server array, a networked server, workstation, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth including wearable systems.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. Specifics in the examples may be used anywhere in one or more embodiments. In one embodiment, a method includes loading a command batch from a virtual machine of a general purpose processor into a physical command ring of a graphics processor, setting a physical tail pointer register of the graphics processor for the command ring based on the size of the command batch, trapping the command batch and the physical tail pointer at a mediator, copying the trapped command batch and the physical tail pointer in a shadow command ring of the mediator, setting a virtual tail pointer at the mediator based on the trapped physical tail pointer, executing the physical command ring by the graphics processor, monitoring the execution of the physical command ring, and clearing the physical command ring and reloading the physical command ring of the graphics processor using the shadow command ring if there is a determined error in executing the command batch.

In further embodiments an error is determined based on a deadlock timer.

In further embodiments the deadlock timer is set upon starting execution of the command batch and an error is determined if the command batch execution is not completed before the deadlock timer expires.

In further embodiments the deadlock timer is started when the graphics processor switches from processing a second command batch from a second virtual machine to the command batch of the first virtual machine.

In further embodiments an error is determined by polling a head pointer counter when a deadlock timer expires.

Further embodiments include resetting the deadlock timer if the graphics processor reads the head pointer before the deadlock timer expires.

Further embodiments include cancelling the deadlock timer if the head pointer is greater than the physical tail pointer.

In further embodiments the shadow command ring contains multiple command batches from multiple virtual machines and wherein reloading the physical command ring comprises reloading the physical command ring without the first command batch corresponding to the current command batch in execution.

Further embodiments include monitoring a physical head pointer register set by the graphics processor and wherein an error is determined by determining whether the graphics processor has changed the head pointer.

In further embodiments the shadow command ring contains multiple command batches from multiple virtual machines and wherein monitoring comprising determining whether the physical head pointer has been changed by comparing it to a virtual head pointer set by the mediator and wherein reloading the physical command ring comprises finding a command batch using a command range between the physical head pointer and the physical tail pointer and reloading the physical command ring without the found command batch.

Further embodiments include the graphics processor setting a head pointer upon executing the command batch and the mediator setting a virtual head pointer based on the physical head pointer.

Further embodiments include increasing the virtual tail pointer and adding the command batch into a job list with physical head pointer equal to the physical tail pointer of the previous command batch.

In further embodiments setting a tail register comprises increasing a corresponding mapped memory input/output tail register.

In further embodiments executing the physical command ring comprises submitting a head pointer of the command batch buffer into a command ring, monitoring the head and tail pointer and fetching a command at the graphics processor from the command ring if the head pointer is not equal to the tail pointer, executing the fetched command by the graphics processor, updating the head pointer by the graphics processor in response to executing the fetched command, and repeating fetching a command, executing the command, and updating the head pointer until the head pointer is equal to the tail pointer.

In further embodiments creating a command batch buffer is performed by a user space application for a particular piece of work.

In further embodiments loading a command batch comprises submitting a command batch buffer to a graphics driver of the virtual machine.

In further embodiments trapping comprises trapping access to mapped memory input/output registers and a graphics translation table of the graphics processor by the virtual machine through a graphics driver.

In further embodiments loading a command batch comprises loading a command batch into one of plurality of command rings, each command ring being for a different task of the graphics processor, such as a render engine, a display engine, and a video codec engine.

In further embodiments the shadow command ring is located in the mediator.

In further embodiments the mediator updates the physical tail register and builds a mapping between the virtual tail register and the physical tail register before the execution of the corresponding command batch is completed.

Some embodiments pertain to a computer-readable medium having instructions that when operated on by the computer cause the computer to perform operations comprising, loading a command batch from a virtual machine of a general purpose processor into a physical command ring of a graphics processor, setting a physical tail pointer register of the graphics processor for the command ring based on the size of the command batch, trapping the command batch and the physical tail pointer at a mediator, copying the trapped command batch and the physical tail pointer in a shadow command ring of the mediator, setting a virtual tail pointer at the mediator based on the trapped physical tail pointer, executing the physical command ring by the graphics processor, monitoring the execution of the physical command ring, and clearing the physical command ring and reloading the physical command ring of the graphics processor using the shadow command ring if there is a determined error in executing the command batch.

In further embodiments an error is determined based on a deadlock timer that is set upon starting execution of the command batch and an error is determined if the command batch execution is not completed before the deadlock timer expires.

In further embodiments an error is determined by polling a head pointer counter when a deadlock timer expires, the operations further comprising resetting the deadlock timer if the graphics processor reads the head pointer before the deadlock timer expires.

In further embodiments the shadow command ring contains multiple command batches from multiple virtual machines and wherein reloading the physical command ring comprises reloading the physical command ring without the first command batch corresponding to the current command batch in execution.

Some embodiments pertain to an apparatus that includes a general purpose processor having a memory and supporting a plurality of virtual machines and a mediator for the virtual machines, and a graphics processor having a physical command ring, wherein a virtual machine of the general purpose processor loads a command batch into the physical command ring of the graphics processor, and sets a physical tail pointer register of the graphics processor for the command ring based on the size of the command batch, wherein the mediator traps the command batch and the physical tail pointer, copies the trapped command batch and the physical tail pointer in a shadow command ring of the mediator, and sets a virtual tail pointer based on the trapped physical tail pointer, wherein the graphics processor executes the physical command ring by monitoring the execution of the physical command ring, wherein the mediator clears the physical command ring and reloads the physical command ring of the graphics processor using the shadow command ring if there is a determined error in executing the command batch.

In further embodiments the mediator further monitors a physical head pointer register set by the graphics processor and wherein an error is determined by determining whether the graphics processor has changed the head pointer.

In further embodiments the shadow command ring contains multiple command batches from multiple virtual machines and wherein the mediator monitors by determining whether the physical head pointer has been changed by comparing it to a virtual head pointer set by the mediator and wherein the mediator reloads the physical command ring by finding a command batch using a command range between the physical head pointer and the physical tail pointer and reloading the physical command ring without the found command batch.

The invention claimed is:

1. A method comprising:
    loading a command batch from a virtual machine of a general purpose processor into a physical command ring of a graphics processor;
    setting a physical tail pointer register of the graphics processor for the command ring based on the size of the command batch;
    trapping the command batch and the physical tail pointer at a mediator;
    copying the trapped command batch and the physical tail pointer in a shadow command ring of the mediator;
    setting a virtual tail pointer at the mediator based on the trapped physical tail pointer;
    executing the physical command ring by the graphics processor;
    monitoring the execution of the physical command ring; and
    clearing the physical command ring and reloading the physical command ring of the graphics processor using the shadow command ring if there is a determined error in executing the command batch.

2. The method of claim 1, wherein an error is determined based on a deadlock timer.

3. The method of claim 2, wherein the deadlock timer is set upon starting execution of the command batch and an error is determined if the command batch execution is not completed before the deadlock timer expires.

4. The method of claim 1, wherein the deadlock timer is started when the graphics processor switches from processing a second command batch from a second virtual machine to the command batch of the first virtual machine.

5. The method of claim 1, wherein an error is determined by polling a head pointer counter when a deadlock timer expires.

6. The method of claim 5, further comprising resetting the deadlock timer if the graphics processor reads the head pointer before the deadlock timer expires.

7. The method of claim 5 further comprising cancelling the deadlock timer if the head pointer is greater than the physical tail pointer.

8. The method of claim 1, wherein the shadow command ring contains multiple command batches from multiple virtual machines and wherein reloading the physical command ring comprises reloading the physical command ring without the first command batch corresponding to the current command batch in execution.

9. The method of claim 1, further comprising monitoring a physical head pointer register set by the graphics processor and wherein an error is determined by determining whether the graphics processor has changed the physical head pointer.

10. The method of claim 9, wherein the shadow command ring contains multiple command batches from multiple virtual machines and wherein monitoring comprising determining whether the physical head pointer has been changed by comparing it to a virtual head pointer set by the mediator and wherein reloading the physical command ring comprises finding a command batch using a command range between the physical head pointer and the physical tail pointer and reloading from the shadow command ring without the found command batch.

11. The method of claim 1, further comprising the graphics processor setting a physical head pointer upon executing the command batch and the mediator setting a virtual head pointer based on the physical head pointer.

12. The method of claim 1, further comprising increasing the virtual tail pointer and adding the command batch into a job list, the command batch having a physical head pointer equal to the physical tail pointer of the previous command batch.

13. The method of claim 1, wherein setting a tail register comprises increasing a corresponding mapped memory input/output tail register.

14. The method of claim 1, wherein executing the physical command ring comprises:
    submitting a head pointer of the command batch buffer into a physical command ring;
    monitoring the head and tail pointer and fetching a command at the graphics processor from the physical command ring if the head pointer is not equal to the tail pointer;
    executing the fetched command by the graphics processor;
    updating the head pointer by the graphics processor in response to executing the fetched command; and
    repeating fetching a command, executing the command, and updating the head pointer until the head pointer is equal to the tail pointer.

15. The method of claim 1, wherein creating a command batch buffer is performed by a user space application for a particular piece of work.

16. The method of claim 1, wherein loading a command batch comprises submitting a command batch buffer to a graphics driver of the virtual machine.

17. The method of claim 1, wherein trapping comprises trapping access to mapped memory input/output registers and a graphics translation table of the graphics processor by the virtual machine through a graphics driver.

18. The method of claim 1, wherein loading a command batch comprises loading a command batch into one of plurality of command rings, each command ring being for a different task of the graphics processor, such as a render engine, a display engine, and a video codec engine.

19. The method of claim 1, wherein the shadow command ring is located in the mediator.

20. The method of claim 1, wherein the mediator updates the physical tail register and builds a mapping between the virtual tail register and the physical tail register before the execution of the corresponding command batch is completed.

21. A non-transitory computer-readable medium having instructions that when operated on by the computer cause the computer to perform operations comprising:
- loading a command batch from a virtual machine of a general purpose processor into a physical command ring of a graphics processor;
- setting a physical tail pointer register of the graphics processor for the command ring based on the size of the command batch;
- trapping the command batch and the physical tail pointer at a mediator;
- copying the trapped command batch and the physical tail pointer in a shadow command ring of the mediator;
- setting a virtual tail pointer at the mediator based on the trapped physical tail pointer;
- executing the physical command ring by the graphics processor;
- monitoring the execution of the physical command ring; and
- clearing the physical command ring and reloading the physical command ring of the graphics processor using the shadow command ring if there is a determined error in executing the command batch.

22. The non-transitory medium of claim 21, wherein an error is determined based on a deadlock timer that is set upon starting execution of the command batch and an error is determined if the command batch execution is not completed before the deadlock timer expires.

23. The non-transitory medium of claim 21, wherein an error is determined by polling a head pointer counter when a deadlock timer expires, the operations further comprising resetting the deadlock timer if the graphics processor reads the head pointer before the deadlock timer expires.

24. The non-transitory medium of claim 21, wherein the shadow command ring contains multiple command batches from multiple virtual machines and wherein reloading the physical command ring comprises reloading the physical command ring without the first command batch corresponding to the current command batch in execution.

25. An apparatus comprising:
- a general purpose processor having a memory and supporting a plurality of virtual machines and a mediator for the virtual machines; and
- a graphics processor having a physical command ring,
- wherein a virtual machine of the general purpose processor loads a command batch into the physical command ring of the graphics processor, and sets a physical tail pointer register of the graphics processor for the command ring based on the size of the command batch,
- wherein the mediator traps the command batch and the physical tail pointer, copies the trapped command batch and the physical tail pointer in a shadow command ring of the mediator, and sets a virtual tail pointer based on the trapped physical tail pointer,
- wherein the graphics processor executes the physical command ring by monitoring and monitors the execution of the physical command ring, and
- wherein the mediator clears the physical command ring and reloads the physical command ring of the graphics processor using the shadow command ring if there is a determined error in executing the command batch.

26. The apparatus of claim 25, wherein the mediator further monitors a physical head pointer register set by the graphics processor and wherein an error is determined by determining whether the graphics processor has changed the physical head pointer.

27. The apparatus of claim 26, wherein the shadow command ring contains multiple command batches from multiple virtual machines and wherein the mediator monitors by determining whether the physical head pointer has been changed by comparing it to a virtual head pointer set by the mediator and wherein the mediator reloads the physical command ring by finding a command batch using a command range between the physical head pointer and the physical tail pointer and reloading from the shadow command ring without the found command batch.

* * * * *